United States Patent
Toprani et al.

(10) Patent No.: US 8,479,488 B2
(45) Date of Patent: Jul. 9, 2013

(54) OXYFUEL GAS TURBINE SYSTEM AND METHOD

(75) Inventors: Amit Surendra Toprani, Greenville, SC (US); Samuel David Draper, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1016 days.

(21) Appl. No.: 12/509,684

(22) Filed: Jul. 27, 2009

(65) Prior Publication Data

US 2011/0016872 A1   Jan. 27, 2011

(51) Int. Cl.
  *F02C 1/00* (2006.01)
  *F02C 6/00* (2006.01)

(52) U.S. Cl.
  USPC ............. 60/39.181; 60/39.183; 60/39.19; 60/727; 60/772

(58) Field of Classification Search
  USPC ............. 60/269; 415/115, 116, 144, 145
  See application file for complete search history.

(56) References Cited

U.S. PATENT DOCUMENTS

| | | | | |
|---|---|---|---|---|
| 3,280,555 A * | 10/1966 | Charpentier et al. | ........... | 60/794 |
| 3,383,033 A * | 5/1968 | Moore | ........... | 415/113 |
| 4,936,097 A * | 6/1990 | Rodgers | ........... | 60/606 |
| 5,523,176 A * | 6/1996 | Fonda-Bonardi | ........... | 429/444 |
| 6,231,302 B1 * | 5/2001 | Bonardi | ........... | 415/105 |
| 6,622,470 B2 | 9/2003 | Viteri et al. | | |
| 6,637,183 B2 | 10/2003 | Viteri et al. | | |
| 8,099,960 B2 * | 1/2012 | Elkady et al. | ........... | 60/748 |

OTHER PUBLICATIONS

"Turbo charger based Gas Turbine Engine" http://www.gasturbine.pwp.blueyonder.co.uk/page1.htm posted on internet on Feb. 9, 2001 the link modified in Jan. 2001, varified with "wayback machine".*

* cited by examiner

*Primary Examiner* — Ehud Gartenberg
*Assistant Examiner* — Arun Goyal
(74) *Attorney, Agent, or Firm* — Dority & Manning, P.A.

(57) ABSTRACT

A gas turbine includes a compressor with a plurality of pressure plates, a combustor downstream from the compressor, and a turbine downstream from the combustor and axially aligned with the compressor. The combustor produces combustion gases that flow to the turbine. A first manifold connected to the combustor contains a first process gas for combustion in the combustor. A second manifold connected upstream of the turbine contains a second process gas, and a portion of the second process gas flows to the plurality of pressure plates.

17 Claims, 3 Drawing Sheets

OXYFUEL GAS TURBINE SYSTEM AND METHOD

FIELD OF THE INVENTION

The present invention generally involves a Brayton cycle gas turbine. More particularly, the present invention relates to a gas turbine that operates using process gases.

BACKGROUND OF THE INVENTION

Gas turbines are widely used in commercial operations for power generation. FIG. 1 illustrates a typical gas turbine 10 known in the art. As shown in FIG. 1, the gas turbine 10 generally includes a compressor 12 at the front, one or more combustors 14 around the middle, and a turbine 16 at the rear. The compressor 12 and the turbine 16 typically share a common rotor 18.

The compressor 12 includes multiple stages of compressor blades 20 attached to the rotor 18. Ambient air, as a working fluid, enters an inlet 22 of the compressor 12, and rotation of the compressor blades 20 progressively compresses the working fluid. Some of the compressed working fluid is extracted from the compressor 12 through extraction plots 23 for other use, and the remainder of the working fluid exits the compressor 12 and flows to the combustors 14.

The working fluid mixes with fuel in the combustors 14, and the mixture ignites to generate combustion gases having a high temperature, pressure, and velocity. The combustion gases exit the combustors 14 and flow to the turbine 16 where they expand to produce work.

Compression of the ambient air in the compressor 12 produces an axial force on the rotor 18 in a forward direction, toward the compressor inlet 22. Expansion of the combustion gases in the turbine 16 produces an axial force on the rotor 18 in an aft direction, toward the turbine exhaust 24. A thrust bearing 26 at the front of the gas turbine 10 holds the rotor 18 in place and prevents axial movement of the rotor 18. To reduce the net axial thrust on the rotor 18, and thus the size and associated cost of the thrust bearing 26, the gas turbine 10 is typically designed so that the axial forces generated by the compressor 12 and the turbine 16 are approximately equal but opposite.

Various commercial processes generate effluent process gases. For example, chemical processes at oil fields generate substantial quantities of pressurized oxygen, carbon dioxide, or nitrogen as effluent process gases. The effluent process gases are transferred for storage and/or ultimate disposal.

The costs associated with the collection, storage, and disposal of the process gases may be considerable, and various attempts have been made to operate a gas turbine system using process gases. However, the process gases have different molecular weights, compressibility, flammability, and other physical characteristics than ambient air, for which the gas turbine is designed. Therefore, the need exists for a gas turbine that can operate using effluent process gases created by commercial operations.

BRIEF DESCRIPTION OF THE INVENTION

Aspects and advantages of the invention are set forth below in the following description, or may be obvious from the description, or may be learned through practice of the invention.

One embodiment of the present invention is a gas turbine that includes a compressor with a plurality of pressure plates, at least one combustor downstream from the compressor, and a turbine downstream from the at least one combustor and axially aligned with the compressor. The combustor produces combustion gases that flow to the turbine. A first manifold is connected to the combustor, and the first manifold contains a first process gas for combustion in the combustor. A second manifold is connected upstream of the turbine, and the second manifold contains a second process gas. A portion of the second process gas flows to the pressure plates.

In an alternate embodiment, a gas turbine includes a compressor with a plurality of pressure plates, at least one combustor downstream from the compressor, and a turbine downstream from the combustor and axially aligned with the compressor. The combustor produces combustion gases that flow to the turbine. A first manifold is connected to the gas turbine upstream of the turbine, and the first manifold contains a first process gas for combustion in the combustor. A second manifold is connected upstream of the turbine, and the second manifold contains a second process gas. A portion of the second process gas flows to the pressure plates.

The present invention also includes a method for operating a gas turbine that has a compressor, a plurality of combustors, and a turbine. The method includes removing compressor blades from the compressor and installing a plurality of pressure plates in the compressor. The method further includes supplying a first process gas to the gas turbine upstream of the turbine and combusting the first process gas in at least one of the combustors. In addition, the method includes supplying a second process gas to the gas turbine upstream of the turbine and directing at least a portion of the second process gas to the pressure plates.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
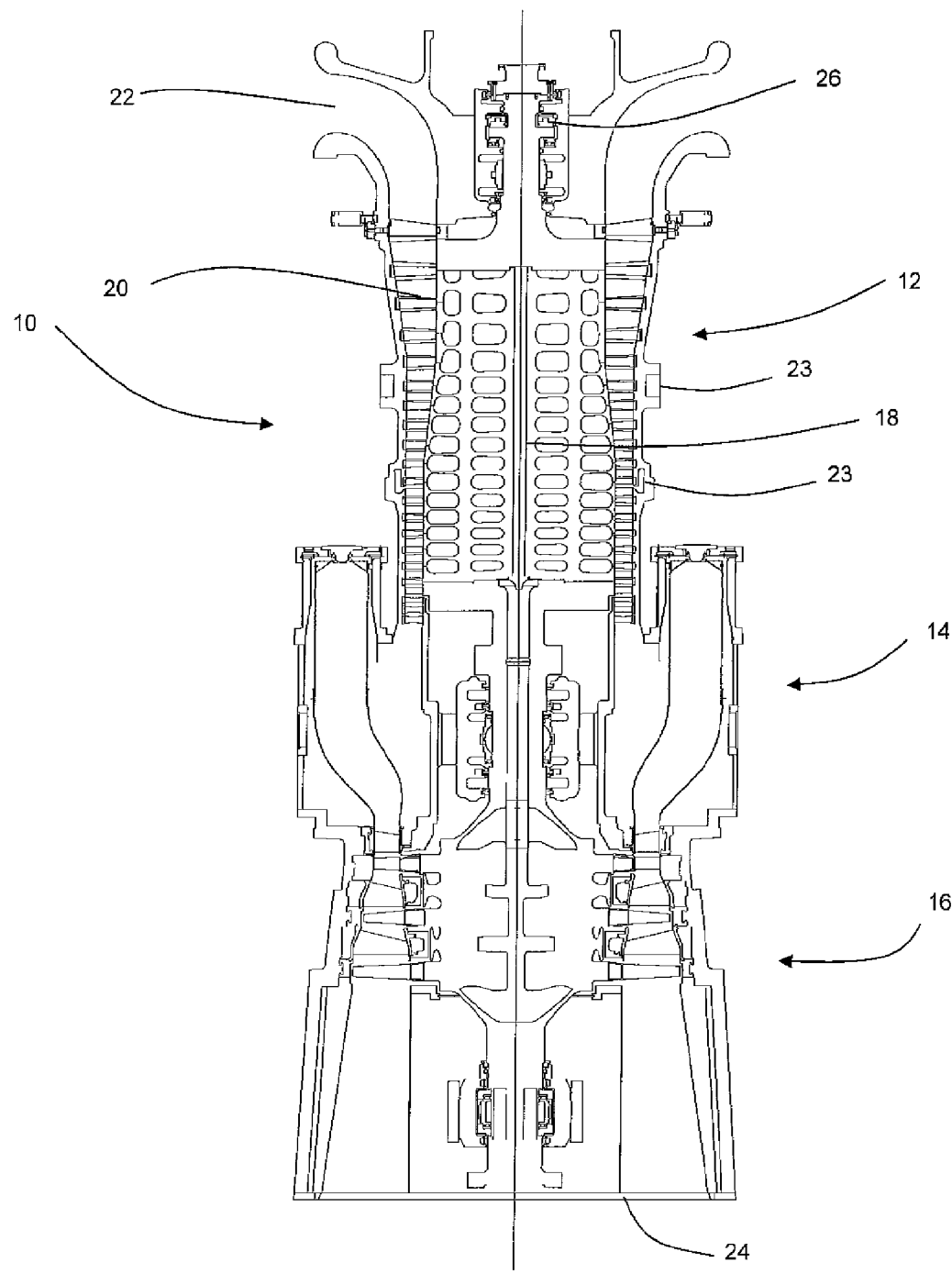
FIG. 1 is a plan drawing of a typical gas turbine known in the art.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
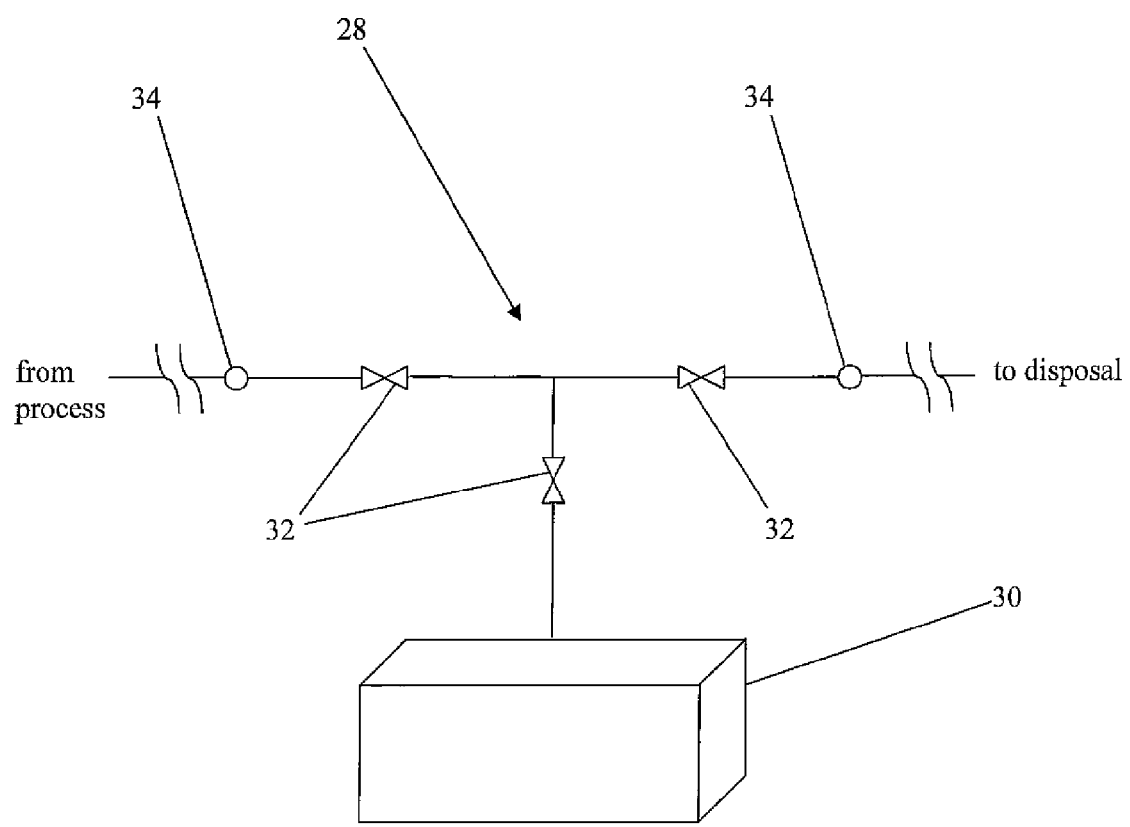
FIG. 2 is a simplified diagram of a conventional piping arrangement for storing and transferring effluent process gases.

FIG. 2 provides a simplified diagram of a typical piping and storage system 28 for effluent process gases generated by a commercial system. As shown in FIG. 2, the effluent process gases may be transferred to one or more containers 30 for subsequent use or transfer. The containers 30 may be any receptacle for holding the effluent process gases, such as drums, bladders, vats, tanks, reservoirs, and other structures known to one of skill in the art for holding a fluid.

Various means are known in the art for transferring the effluent process gases to and from the containers 30. For example, as shown in FIG. 2, a conventional piping and valve arrangement 32 may provide fluid communication between the commercial process, the containers 30, and the ultimate disposal process for the process gases. One or more booster pumps 34, pressurized air, or even gravity may be used to transfer the effluent process gases between locations. Alternatively, the effluent process gases may be collected and stored at one location in containers, and the containers may be shipped by road, rail, air, or water to another location for continued storage or ultimate disposal.

Figure 3:
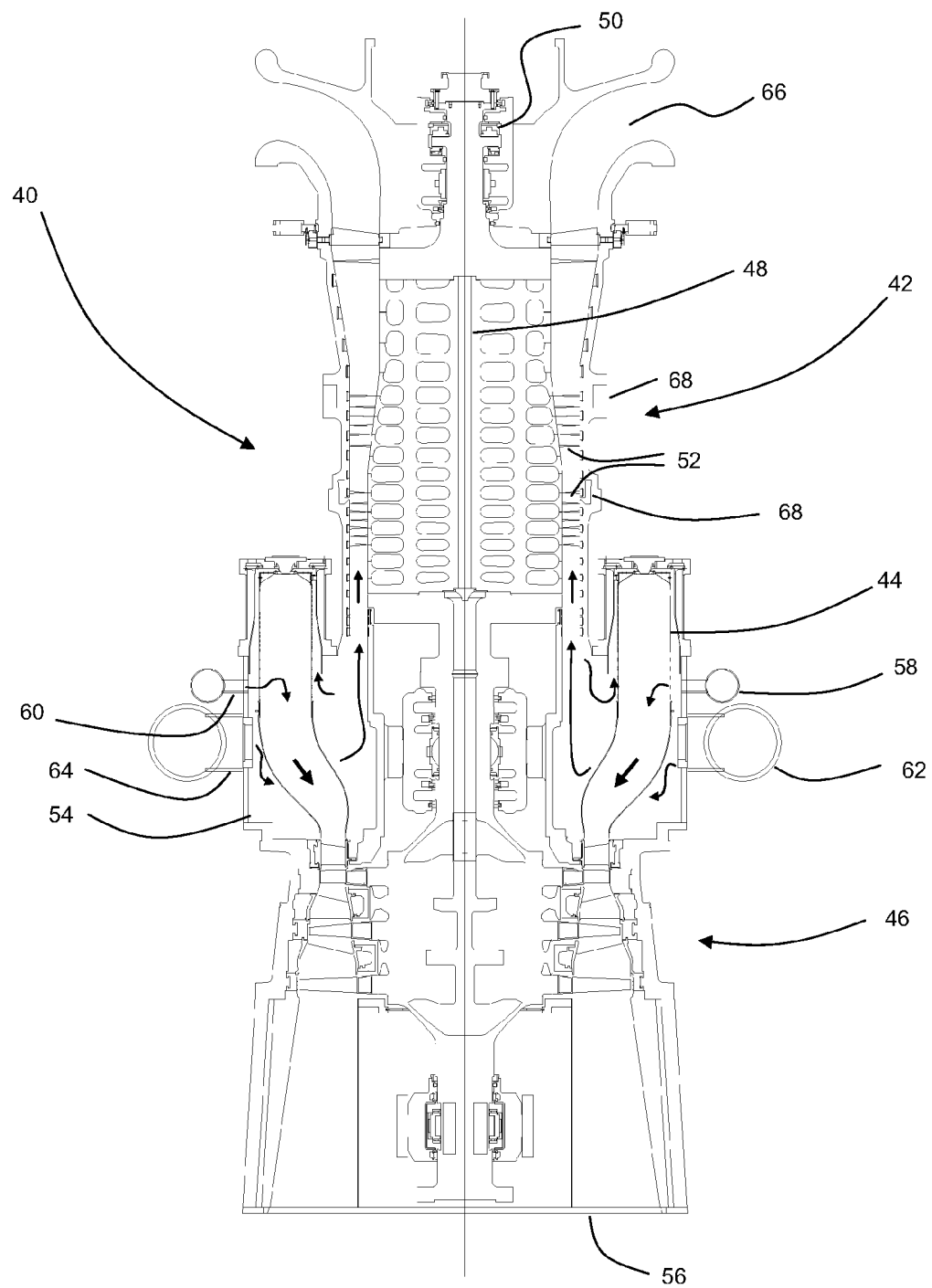
FIG. 3 is a plan view of a gas turbine according to an embodiment of the present invention.

FIG. 3 provides a plan view of a gas turbine 40 according to an embodiment of the present invention. As shown in FIG. 3, the gas turbine 40 nominally includes a compressor 42 at the front, one or more combustors 44 around the middle, and a turbine 46 at the rear. A rotor 48 connects and axially aligns the compressor 42 and the turbine 46. A thrust bearing 50 at the front of the gas turbine 40 holds the rotor 48 in place and prevents axial movement of the rotor 48. Although FIG. 3 illustrates the thrust bearing 50 at the front of the gas turbine 40, the thrust bearing 50 may be located at any position along the rotor 48.

The compressor 42 has been modified from the prior art compressor previously described with respect to FIG. 1. Specifically, the compressor blades present in the typical compressor have been removed and replaced with one or more pressure plates 52. The pressure plates 52 are defined to include any surface that substantially prevents or restricts the flow of gases or fluids past the pressure plates 52 in either direction. The pressure plates 52 may rotate with the rotor 48 or may be stationary with respect to the rotor 48.

The combustors 44 are arranged around the gas turbine 40 between the compressor 42 and the turbine 46. A casing 54 surrounds the combustors 44 and provides a sealed enclosure around the combustors 44. The combustors 44 produce combustion gases that flow to the turbine 46.

The turbine 46 is axially aligned with the compressor 42. The combustion gases from the combustors 44 expand in the turbine 46 to produce work. Expansion of the combustion gases in the turbine 46 produces an axial force on the rotor 48 in an aft direction, toward the turbine exhaust 56.

A first manifold 58 containing a first process gas connects to the gas turbine 40 at any point upstream of the turbine 46. As shown in FIG. 3, branch lines 60 may provide a fluid communication for the flow of the first process gas from the first manifold 58 directly to the combustors 44. The first process gas may be oxygen or any other oxygen containing process gas for combustion in the combustors 44.

A second manifold 62 containing a second process gas similarly surrounds the gas turbine 40 upstream of the turbine 46. Branch lines 64 provide a fluid communication for the flow of the second process gas from the second manifold 62 to the gas turbine 40. The second process gas may be carbon dioxide, nitrogen, or any other diluent for mixing with the first process gas.

The second process gas flows around the combustors 44 and away from the turbine 46. A portion of the second process gas flows to the pressure plates 52 in the compressor 42. The pressure of the second process gas against the pressure plates 52 produces an axial force on the rotor 48 in a forward direction, toward the compressor inlet 66. The axial force on the rotor 48 in the compressor 42 is thus in the opposite direction as the axial force on the rotor 48 in the turbine 46, reducing the net axial thrust on the rotor 48 and thus the size and associated cost of the thrust bearing 50. The temperature of the second process gas may heat the pressure plates 52 and rotor 48. As a result, a third process gas may be supplied to the compressor 42 to cool the pressure plates 54 and rotor 48. The third process gas may be supplied to the compressor 42 through extraction ports 68 that already exist on the compressor 42. The third process gas may be any available gas having a suitable temperature for cooling the pressure plates 52 and rotor 48. The third process gas may even be the same as the second process gas, except having a lower temperature than the second process gas.

The remainder of the second process gas mixes with the first process gas in the combustors 44. The mixture of the first and second process gases ignite to produce the combustion gases having a high temperature, pressure, and velocity. The combustion gases exit the combustors 44 and flow to the turbine 46. As previously described, the expansion of the combustion gases in the turbine 46 produce work and an axial force on the rotor 48 in the aft direction, toward the turbine exhaust 56.

Embodiments of the present invention may also provide a method for operating an existing gas turbine 40 to use process gases, as shown in FIG. 3. As shown in FIG. 3, the gas turbine 40 nominally includes a compressor 42, one or more combustors 44, and a turbine 46, as is known in the art.

The compressor 42 is modified by removing the compressor blades, and one or more pressure plates 52 are installed in place of the compressor blades in the compressor 42.

A first manifold 58 supplies a first process gas to the gas turbine 40 upstream of the turbine 56, and the combustors 44 ignite the first process gas. A second manifold 62 supplies a second process gas to the gas turbine 40 upstream of the turbine 60. At least a portion of the second process gas flows to the pressure plates 52. The process gases may be any effluent process gas produced from another commercial system, as previously described.

The compressor 42 may be further modified by supplying a third process gas to one or more of the pressure plates 52 for cooling. The third process gas may be any available gas having a suitable temperature for cooling the pressure plates 52 and rotor 48. The third process gas may even be the same gas as the second process gas, except having a lower temperature than the second process gas.

It should be appreciated by those skilled in the art that modifications and variations can be made to the embodiments of the invention set forth herein without departing from the scope and spirit of the invention as set forth in the appended claims and their equivalents.

What is claimed is:

1. A gas turbine, comprising:
   a. a compressor, the compressor comprising a plurality of pressure plates that extend radially in the compressor to prevent fluid flow through the compressor;
   b. at least one combustor downstream from the compressor;
   c. a turbine downstream from the at least one combustor and axially aligned with the compressor, wherein the at least one combustor produces combustion gases that flow to the turbine;

d. a first manifold connected to the at least one combustor, the first manifold containing a first process gas for combustion in the at least one combustor;
e. a second manifold connected upstream of the turbine, the second manifold containing a second process gas, wherein a portion of the second process gas flows to the plurality of pressure plates.

2. The gas turbine as recited in claim 1, further including a plurality of combustors.

3. The gas turbine as recited in claim 2, wherein the first manifold is connected to each of the plurality of combustors.

4. The gas turbine as recited in claim 1, wherein the second process gas is carbon dioxide or nitrogen.

5. The gas turbine as recited in claim 1, wherein the second process gas enters the gas turbine and flows away from the turbine.

6. The gas turbine as recited in claim 1, further including an extraction port on the compressor proximate to the plurality of pressure plates, wherein a third process gas flows through the extraction port for cooling the pressure plates.

7. A gas turbine, comprising:
a. a compressor, the compressor comprising a plurality of pressure plates that extend radially in the compressor to prevent fluid flow through the compressor;
b. at least one combustor downstream from the compressor;
c. a turbine downstream from the at least one combustor and axially aligned with the compressor, wherein the at least one combustor produces combustion gases that flow to the turbine;
d. a first manifold connected to the gas turbine upstream of the turbine, the first manifold containing a first process gas for combustion in the at least one combustor;
e. a second manifold connected upstream of the turbine, the second manifold containing a second process gas, wherein a portion of the second process gas flows to the plurality of pressure plates.

8. The gas turbine as recited in claim 7, further including a plurality of combustors.

9. The gas turbine as recited in claim 8, wherein the first manifold is connected to each of the plurality of combustors.

10. The gas turbine as recited in claim 7, wherein the second process gas is carbon dioxide or nitrogen.

11. The gas turbine as recited in claim 7, wherein the second process gas enters the gas turbine and flows away from the turbine.

12. The gas turbine as recited in claim 7, further including an extraction port on the compressor proximate to the plurality of pressure plates, wherein a third process gas flows through the extraction port for cooling the pressure plates.

13. A method for operating a gas turbine, the gas turbine having a compressor, a plurality of combustors, and a turbine, the method comprising:
a. removing compressor blades from the compressor;
b. installing a plurality of pressure plates in the compressor to prevent fluid flow through the compressor;
c. supplying a first process gas to the gas turbine upstream of the turbine;
d. combusting the first process gas in at least one of the plurality of combustors;
e. supplying a second process gas to the gas turbine upstream of the turbine; and
f. directing at least a portion of the second process gas to the plurality of pressure plates.

14. The method of claim 13, further including supplying the first process gas to each of the plurality of combustors.

15. The method of claim 13, further including mixing the first process gas with the second process gas prior to combustion.

16. The method of claim 13, wherein the second process gas is carbon dioxide or oxygen.

17. The method of claim 13, further including cooling at least one of the plurality of pressure plates with a third process gas.

* * * * *